United States Patent
Ramesh et al.

(10) Patent No.: US 9,894,426 B2
(45) Date of Patent: *Feb. 13, 2018

(54) ADVANCED FIBER NODE

(71) Applicant: Maxlinear, Inc, Carlsbad, CA (US)

(72) Inventors: Sridhar Ramesh, San Diego, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/979,825

(22) Filed: Dec. 28, 2015

(65) Prior Publication Data

US 2016/0112777 A1     Apr. 21, 2016

Related U.S. Application Data

(63) Continuation of application No. 14/147,628, filed on Jan. 6, 2014, now Pat. No. 9,225,426.

(60) Provisional application No. 61/753,197, filed on Jan. 16, 2013.

(51) Int. Cl.
| | |
|---|---|
| *H04B 10/27* | (2013.01) |
| *H04Q 11/00* | (2006.01) |
| *H04B 10/40* | (2013.01) |
| *H04B 10/2575* | (2013.01) |

(52) U.S. Cl.
CPC ... *H04Q 11/0062* (2013.01); *H04B 10/25751* (2013.01); *H04B 10/27* (2013.01); *H04B 10/271* (2013.01); *H04B 10/40* (2013.01)

(58) Field of Classification Search
None
See application file for complete search history.

(56) References Cited

U.S. PATENT DOCUMENTS

| | | | |
|---|---|---|---|
| 7,688,828 B2* | 3/2010 | Chapman | H04L 12/2801 370/395.21 |
| 2008/0002669 A1 | 1/2008 | O'Brien et al. | |
| 2008/0175143 A1 | 7/2008 | Ansley | |
| 2009/0133095 A1* | 5/2009 | Phillips | H04N 7/104 725/149 |
| 2010/0135265 A1* | 6/2010 | Asati | H04L 12/2801 370/338 |

(Continued)

OTHER PUBLICATIONS

Int'l Search Report and Written Opinion for PCT/US2014/011483 dated May 9, 2014.

*Primary Examiner* — Li Liu
(74) *Attorney, Agent, or Firm* — McAndrews, Held & Malloy, Ltd.

(57) ABSTRACT

Circuitry of a hybrid fiber-coaxial network may comprise a first transceiver configured to connect the circuitry to an optical link, a second transceiver configured to connect the circuitry to an electrical link, a first processing path, a second processing path, and a switching circuit. In a first configuration, the switching circuit may couple the first transceiver to the second transceiver via the first processing path. In a second configuration, the switching circuit may couple the first transceiver to the second transceiver via the second processing path. The first transceiver may comprise a passive optical network (PON) transceiver and the second transceiver may comprise a data over coaxial service interface specification (DOCSIS) physical layer transceiver. The switching circuit may be configured based on the type of headend to which the circuitry is connected.

20 Claims, 5 Drawing Sheets

(56) References Cited

U.S. PATENT DOCUMENTS

| | | | |
|---|---|---|---|
| 2010/0142949 A1* | 6/2010 | Mysore | H04B 10/25751 398/48 |
| 2012/0257891 A1* | 10/2012 | Boyd | H04L 47/6215 398/45 |
| 2012/0257893 A1 | 10/2012 | Boyd et al. | |
| 2012/0291084 A1 | 11/2012 | Rakib | |

* cited by examiner

ADVANCED FIBER NODE

CLAIM OF PRIORITY

This patent application is a continuation of U.S. patent application Ser. No. 14/147,628 filed Jan. 6, 2014 (now U.S. Pat. No. 9,225,426), which makes reference to, claim priority to, and claims benefit from U.S. Provisional Patent Application No. 61/753,197, which was filed on Jan. 16, 2013.

The above identified application is hereby incorporated herein by reference in its entirety.

TECHNICAL FIELD

Aspects of the present application relate to communication networks. More specifically, aspects of the present application relate to a method and system for an advanced fiber node.

BACKGROUND OF THE INVENTION

Conventional systems and methods for communications can be overly power hungry, slow, expensive, and inflexible. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods for an advanced fiber node, substantially as shown in and/or described in connection with at least one of the figures, as set forth more completely in the claims.

Advantages, aspects and novel features of the present disclosure, as well as details of various implementations thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
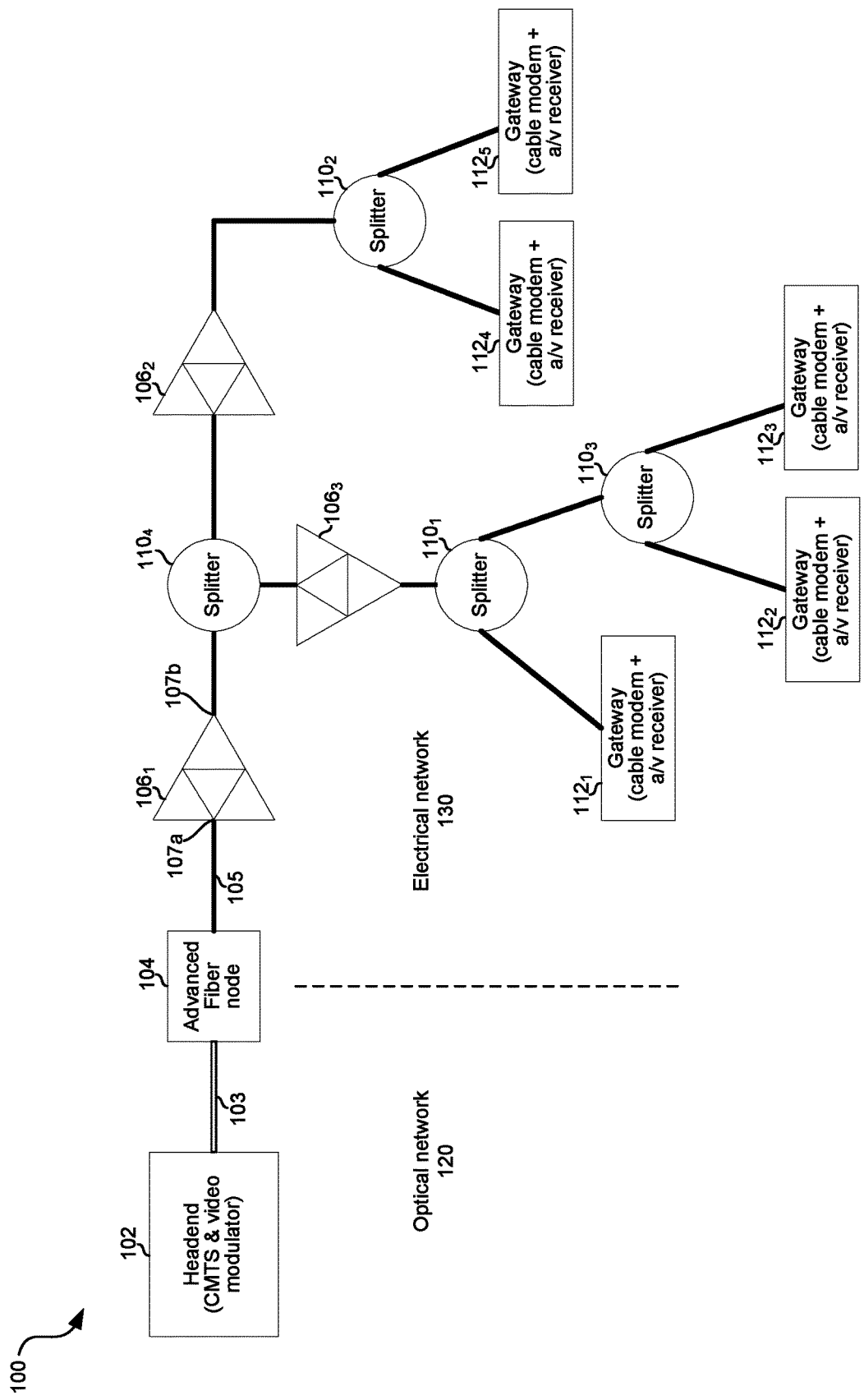
FIG. 1 is a diagram depicting an example hybrid fiber-coaxial (HFC) network.

FIG. 1 is a diagram depicting an example hybrid fiber-coaxial (HFC) network. The example HFC network 100 comprises a headend 102, an advanced fiber node 104, amplifiers $106_1$-$106_3$, splitters $110_1$-$110_4$, and gateways $112_1$-$112_5$. One feature of the fiber node 104 that makes it "advanced" is the presence of a digital optical interface such as passive optical network (PoN) interface, as is further discussed below. One feature of the fiber node 104 that makes it "advanced" is the reconfigurability of the fiber node 104, as is further discussed below.

The headend 102 comprises a cable modem termination system (CMTS) for handling data over coaxial service interface specification (DOCSIS) traffic to and from the cable modems of gateways $112_1$-$112_5$ and one or more modulators (e.g., one or more "edge QAMs") for handling downstream multimedia traffic to the audio/video receivers of the gateways $112_1$-$112_5$.

The advanced fiber node (AFN) 104 may provide an interface between the optical network 120 and the electrical network 130. The AFN 104 may, for example, be as described below with reference to FIGS. 2A-2B.

Each of the amplifiers $106_1$-$106_3$ may comprise a bidirectional amplifier which may amplify downstream signals and upstream signals, where downstream signals are input via upstream interface 107a and output via downstream interface 107b, and upstream signals are input via downstream interface 107b and output via upstream interface 107a. The amplifier $106_1$, which amplifies signals along the main coaxial "trunk," may be referred to as a "trunk amplifier." The amplifiers $106_2$ and $106_3$, which amplify signals along "branches" split off from the trunk, may be referred to as "branch" or "distribution" amplifiers.

Each of the splitters $110_1$-$110_4$ comprises circuitry operable to output signals incident on each of its interfaces onto each of its other interfaces. Each of the splitters $110_1$-$110_4$ may be a passive or active device which supports bidirectional transfer of signals.

Each of the gateways $112_1$-$112_5$ may comprise cable modem circuitry operable to communicate with, and be managed by, the headend 102 in accordance with one or more standards (e.g., DOCSIS). Each of the gateways $112_1$-$112_5$ may comprise one or more audio/video receivers operable to receive multimedia content (e.g., in the form of one or more MPEG streams) transmitted by the headend 102 in accordance with one or more standards used for cable television. Each of the gateways $112_1$-$112_5$ may reside at the premises of a cable/DOCSIS subscriber.

Figure 2A:
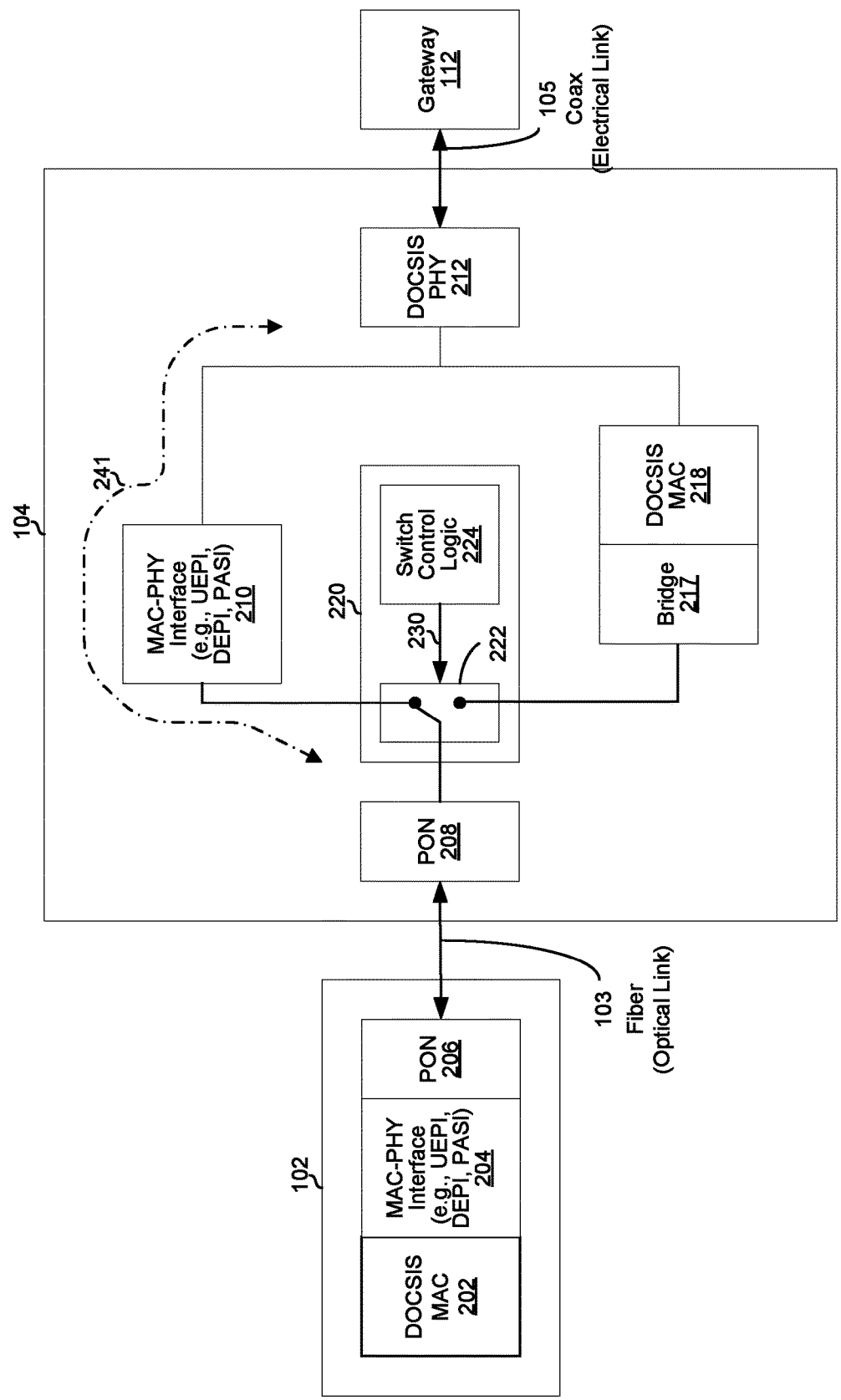
FIG. 2A depicts an example implementation of an advanced fiber node configured for use with a headend equipped with a cable modem termination system (CMTS).
Figure 2B:
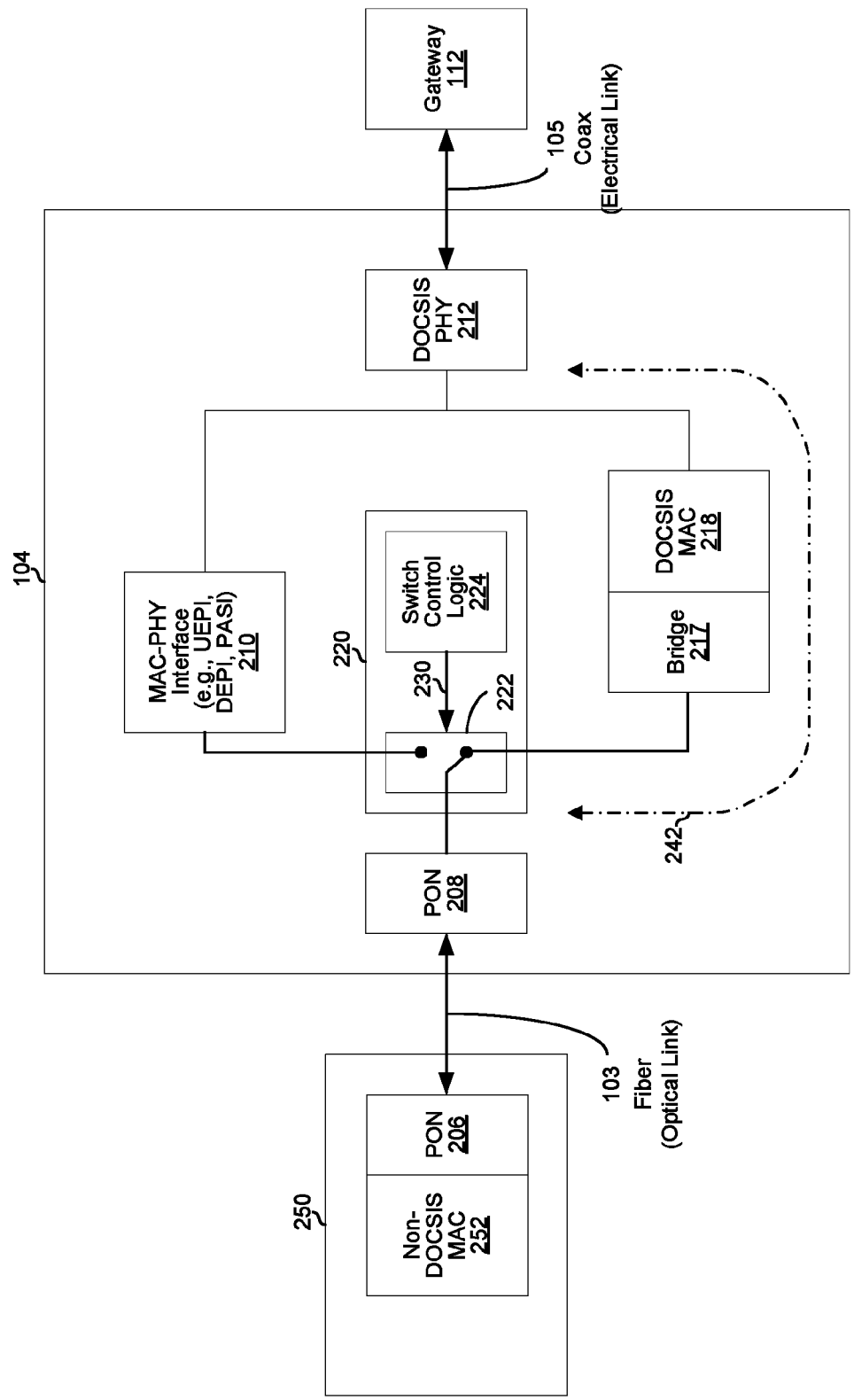
FIG. 2B depicts an example implementation of an advanced fiber node configured for use with a headend that is not equipped with a CMTS.

Referring now to FIGS. 2A and 2B, common to both figures are the AFN 104, and the gateway 112. The gateway 112 representing one of potentially many gateways served via FN 104. The FN 104 comprises a PON interface 208, switching circuitry 220, MAC/PHY interface 210, bridging circuitry 217, DOCSIS MAC circuitry 218, and DOCSIS PHY circuitry 212.

The passive optical network (PON) interface 206 comprises circuitry operable to communicate over the fiber 103 in accordance with one or more optical network standards such as, for example, Ethernet over passive optical network (EPON) and/or gigabit Ethernet over passive optical network (GPON).

The switching circuitry 220 is operable to switch between two processing paths of the FN 104, where the first path comprises the MAC/PHY interface 210 and the second path comprises bridging circuitry 217 and DOCSIS MAC 218. The switching circuitry 220 may comprise, for example, a switch 222 (e.g., a transmission gate, a relay, a MEMS switch, and/or the like) and switch control logic 224 that controls the position of the switch 222 via control signal 230. In an example implementation, control logic 224 may control a configuration of switch 222 autonomously (e.g., based on monitoring or "sniffing" of signals received by the FN 104) by the switch control logic circuit 224. In another example implementation, control logic 224 may control configuration of switch 222 in response to a reconfiguration command sent to the FN 104 over the fiber 103 or over the coax 105.

The MAC/PHY interface 210 is operable to interface the DOCSIS media access control (MAC) 202 to a remotely located PHY. The MAC/PHY interface 210 may be, for example, an upstream external PHY interface (UEPI), downstream external PHY interface (DEPI), a packet access shelf interface (PASI) and/or any other suitable interface.

The bridging circuitry 217 is operable to convert between signals suitably formatted for the PON interface 208 and signal formatted for the DOCSIS MAC 218. That is, the bridging circuitry 217 may bridge between a first protocol (e.g., Ethernet) and DOCSIS (1.0, 2.0, 3.0, and/or future revisions of the standard).

The DOCSIS MAC circuitry 218 is operable to perform media access control functions set forth in one or more versions of the DOCSIS standard. These functions may include DOCSIS network management functions such as registration (including ranging) and deregistration of gateways 112, and allocation of bandwidth on the coax 105 among gateways 112 served via the coax 105.

The DOCSIS PHY 212 is operable to perform physical layer functions set forth in one or more versions of the DOCSIS standard.

Now referring to FIG. 2A, shown in addition to the FN 104 and gateway 112 the CMTS-equipped headend 102 comprising media access control (MAC) circuitry 202, MAC/PHY interface circuitry 204, and a passive optical network (PON) interface 206. In FIG. 2A, the FN 104 is configured to use the first processing path 241 for communicating with the headend 102.

In the downstream direction, DOCSIS MAC 202 outputs DOCSIS messages to the MAC/PHY interface 204. The MAC/PHY interface 204 which encapsulates and/or reformats them and then passes them to the PON interface 206. The PON interface 206 may perform encapsulation and/or reformatting and then convert the electrical signals to optical signals for transmission over the fiber 103. The PON interface 208 converts the optical signals back to electrical signals, removes any encapsulation and/or reformatting performed by PON interface 206, and then passes (via switch 222) the received signals to the MAC/PHY interface 210. The MAC/PHY interface 210 removes encapsulation and/or reformatting added by the MAC/PHY interface 204 to recover the DOCSIS messages output by DOCSIS MAC 202. The DOCSIS messages are then passed to the DOCSIS PHY 212 for transmission to the gateway 112 via coax 105.

In the upstream direction, the DOCSIS PHY 212 receives DOCSIS signals from the gateway 112 via coax 105. The DOCSIS PHY 212 recovers the DOCSIS MAC (data link layer) messages and passes them to the MAC-PHY interface 210. The MAC/PHY interface 210 encapsulates and/or reformats the signals and then passes them (via switch 222) to the PON interface 208. The PON interface 208 may perform encapsulation and/or reformatting and then convert the electrical signals to optical signals for transmission over the fiber 103. The PON interface 206 converts the optical signals back to electrical signals, removes any encapsulation and/or reformatting performed by PON interface 208, and then passes the received signals to the MAC/PHY interface 204. The MAC/PHY interface 204 removes encapsulation and/or reformatting added by the MAC/PHY interface 210 to recover the DOCSIS signals output by the DOCSIS PHY 212. The DOCSIS signals are then passed to the DOCSIS MAC 202.

Thus, using the first processing path 241, DOCSIS packets are effectively tunneled over the passive optical network (PON) on fiber 103 such that the presence of the interfaces 204, 210 and the passive optical network are transparent to the headend 102 (at the MAC layer and above) and to the gateway 112. As a result, DOCSIS network management functions (media access planning, registration/deregistration of gateways, tiered provisioning, billing, etc.) can be performed by the headend 102.

Now referring to FIG. 2B, shown in addition to the FN 104 and gateway 112, is a non-CMTS equipped headend 250 (may be referred to as an optical line terminal) comprising a non-DOCSIS MAC 252 and a passive optical network (PON) interface 206. In FIG. 2B, the FN 104 is configured to use the second processing path 242 for communicating with the non-CMTS-equipped headend 250. The non-DOCSIS MAC 252 may generate data link layer signals in accordance with a standard other than DOCSIS (e.g., Ethernet).

In the downstream direction, the non-DOCSIS MAC 252 outputs non-DOCSIS packets to PON interface 206. The PON interface 206 may perform encapsulation and/or reformatting of the packets and then convert the electrical signals to optical signals for transmission over the fiber 103. The PON interface 208 converts the optical signals back to electrical signals, removes any encapsulation and/or reformatting performed by PON interface 206, and then passes (via switch 222) the received packets to the bridging circuitry 217. The bridging circuitry 217 removes encapsulation and/or formatting added by the non-DOCSIS MAC 252 and then passes the recovered data to the DOCSIS MAC 218. The DOCSIS MAC 218 then manages the transmission of the data to the gateway 112 via DOCSIS PHY 212 and coax 105 in accordance with DOCSIS protocols.

In the upstream direction, the DOCSIS PHY 212 receives DOCSIS signals from the gateway 112 via coax 105. The DOCSIS PHY 212 recovers the DOCSIS MAC (data link layer) messages and passes them to the DOCSIS MAC 218. DOCSIS MAC 218 recovers the data link layer messages and passes them to bridging circuitry 217. The bridging circuitry 217 removes encapsulation and/or formatting added by the DOCSIS MAC 218 and then passes the recovered data to the PON interface 208. The PON interface 208 may perform encapsulation and/or reformatting of the packets and then convert the electrical signals to optical signals for transmission over the fiber 103. The PON interface 206 converts the optical signals back to electrical signals, removes any encapsulation and/or reformatting performed by PON interface 208, and then passes the signals to the non-DOCSIS MAC 252.

Thus, using the second processing path 242, DOCSIS originates and terminates in the FN 104. An advantage of this configuration is that DOCSIS gateways 112 can be deployed in the HFC without having to equip the headend 250 with a cable modem termination system (CMTS). Rather, the DOCSIS MAC 218 in the FN 104 acts as the CMTS. That is, CMTS functions such as registration and deregistration of gateways, media access planning for allocating bandwidth on the coax 105, and/or the like may be performed in the FN 104. CMTS functions performed in the FN 104 may be somewhat simplified due to limited resources in the FN 104 as compared to in the headend 102.

Thus, via a simple reconfiguration of switch 222, the FN 104 depicted in FIGS. 2A and 2B supports both remote PHY (FIG. 2A) and DOCSIS Ethernet over Coax (EoC) installations (FIG. 2B). In an example implementation, where DOCSIS is first being rolled out in a region, the FN 104 may initially be configured to the EoC (FIG. 2B) configuration. Then, once the number of DOCSIS CPEs (e.g., the gateways 112$_1$-112$_5$) in the area reaches a critical mass, the provider may decide it is worth the investment to install a CMTS at the headend. Upon installation of the CMTS in the headend 250, the FN 104 may be reconfigured to the configuration shown in FIG. 2A. The gateways 112 may continue to function without having to be replaced or needing on-site interaction by a service technician.

Figure 3:
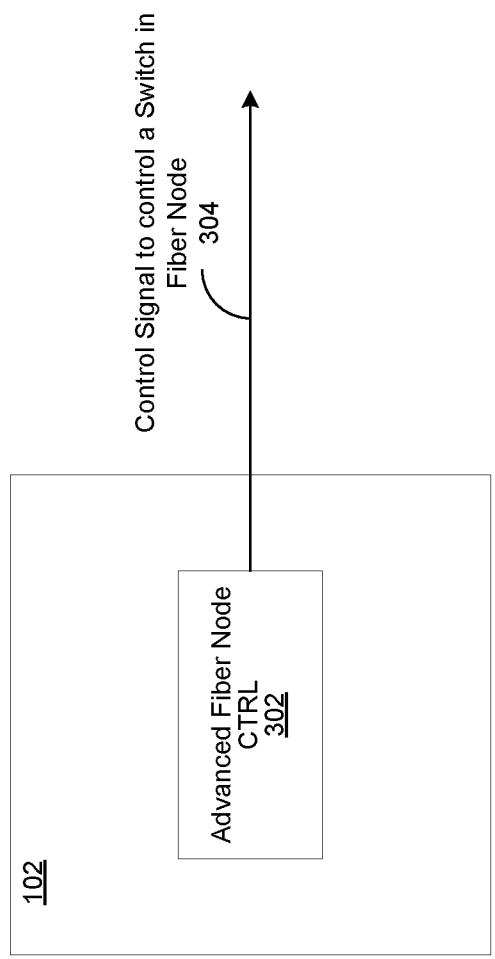
FIG. 3 is a diagram depicting an example headend configured for controlling an advanced fiber node.

FIG. 3 is a diagram depicting an example headend configured for controlling an advanced fiber node. Shown in FIG. 3 is AFN configuration control circuitry 302 (other components of the headend 102 are omitted in FIG. 3 for clarity of illustration). The AFN configuration control circuit 302 may be operable to generate a control signal 304 to control the configuration of the switch 222 in the switching circuitry 220 of the AFN 104. In this regard, in an example embodiment of this disclosure, the AFN 104 may be configured to receive the signal 304 in-band (e.g., by sniffing packets received from the headend 102) and/or out-of-band with the other traffic on fiber 103.

Figure 4:
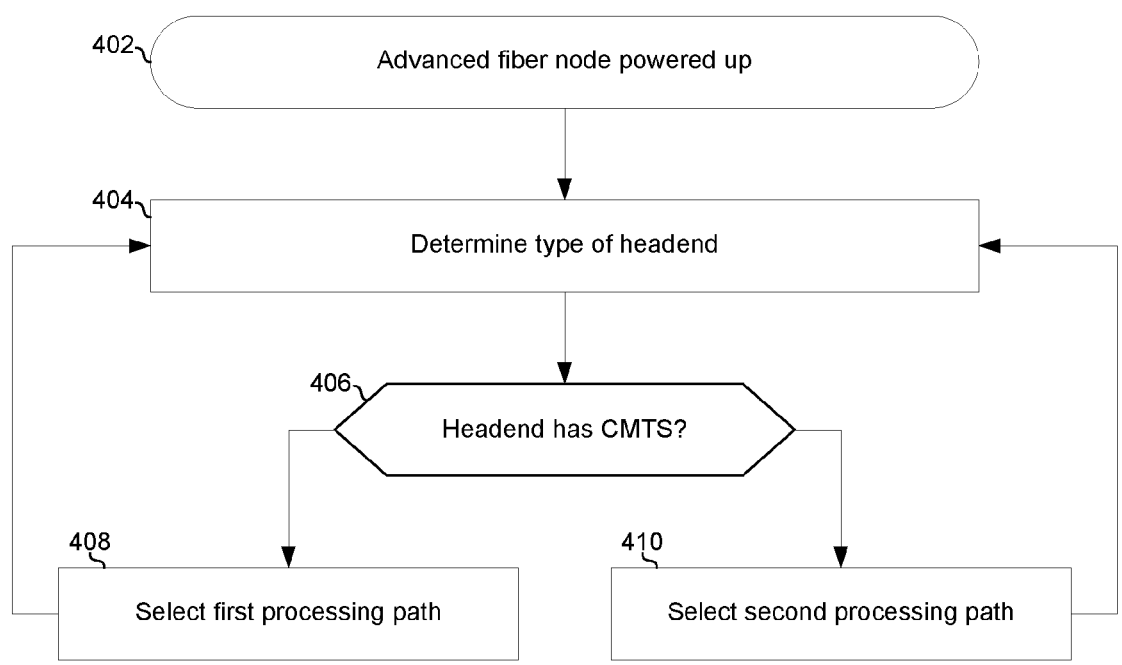
FIG. 4 is a flow chart illustrating an example process for configuring an advanced fiber node.

FIG. 4 is a flow chart illustrating an example process for configuring an advanced fiber node. In block 402, the AFN 104 is powered up. In block 404, the AFN 104 determines the type of headend to which it is connected. The determination may be made, for example, by inspecting or "sniffing" in-band traffic received via the fiber 103, or by monitoring a channel (in-band or out-of-band) to receive a configuration command from the headend 102 or an identification signal from the headend that identifies whether the headend is equipped with a CMTS. In block 406 it is determined whether the headend is equipped with a CMTS. If so, then in block 408 the first processing path 241 is selected. If not, then in block 410 the second processing path 242 is selected. After blocks 408 and 410, the process returns to block 404. In this manner, the FN 104 may periodically or occasionally monitor for changes in the type of headend.

In various embodiments of this disclosure, an advanced fiber node (e.g., 104) of a hybrid fiber-coaxial (HFC) network (e.g., 100) may comprise circuitry that includes a first transceiver (e.g., 208) configured to connect the advanced fiber node to an optical link (e.g., 103), a second transceiver (e.g., 212) configured to connect the advanced fiber node to an electrical link (e.g., 105), a first processing path (e.g., 241), a second processing path (e.g., 242), and a switching circuit (e.g., 220). In a first configuration, the switching circuit couples the first transceiver to the second transceiver via the first processing path. In a second configuration, the switching circuit couples the first transceiver to the second transceiver via the second processing path. The first transceiver may comprise a passive optical network (PON) transceiver, and the second transceiver may comprise a data over coaxial service interface specification (DOCSIS) transceiver. In an example implementation, the second processing path may be operable to perform functions of a cable modem terminal system (CMTS). In this regard, the functions of CMTS may include media access planning for allocating bandwidth on the electrical link.

In an example implementation, the first processing path comprises one or both of an upstream external PHY interface (UEPI) and a downstream external PHY interface (DEPI), and the second processing path comprises an optical network unit (ONU) and a DOCSIS media access control (MAC) circuit. The switching circuit 220 may be configured into the first configuration while the first transceiver is coupled to a headend 102 which uses one or both of a UEPI and a DEPI for communicating with the AFN 104. The switching circuit 220 may be configured into the second configuration while the first transceiver is coupled to a headend 102 which does not use either a UEPI or a DEPI for communicating with the AFN 104.

In an example implementation, the first processing path 241 comprises a packet shelf to access shelf interface (PASI) (e.g., 210), and the second processing path 242 comprises a protocol bridging circuit (e.g., 217) and a DOCSIS media access control (MAC) circuit (e.g., 218). In this regard, the switching circuit may be configured into the first configuration while the first transceiver is coupled to a headend which uses a PASI for communicating with the advanced fiber node. The switching circuit may be configured into the second configuration while the first transceiver is coupled to a headend which does not use a PASI for communicating with the advanced fiber node.

In some instances, the switching circuit 220 may be configured based on a command (e.g., 304) received via the optical link 103. In other instances, the advanced fiber node may be operable to autonomously detect the type of headend to which it is connected (e.g., CMTS-equipped, or non-CMTS-equipped), and configure the switching circuit based on the detected type of headend.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the methods described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    circuitry for use in a hybrid fiber-coaxial network, the circuitry comprising:
        a first transceiver configured to connect said circuitry to an optical link;
        a second transceiver configured to connect said circuitry to an electrical link;
        a first processing path;
        a second processing path in parallel with said first processing path; and
        a switching circuit, wherein:
            in a first configuration, said switching circuit couples said first transceiver to said second transceiver via said first processing path and said first transceiver is coupled to a headend which uses one or both of an upstream external PHY interface (UEPI) and a downstream external PHY interface (DEPI); and
            in a second configuration, said switching circuit couples said first transceiver to said second transceiver via said second processing path and said first transceiver is coupled to a headend which does not use either a UEPI or a DEPI.

2. The system of claim 1, wherein:
    said first transceiver comprises a passive optical network (PON) transceiver; and
    said second transceiver comprises a data over coaxial service interface specification (DOCSIS) physical layer transceiver.

3. The system of claim 2, wherein:
    said first processing path comprises one or both of a UEPI and a DEPI; and
    said second processing path comprises an optical network unit (ONU) and a DOCSIS media access control (MAC) circuit.

4. The system of claim 2, wherein:
    said first processing path comprises a packet shelf to access shelf interface (PASI); and
    said second processing path comprises a protocol bridging circuit and a DOCSIS media access control (MAC) circuit.

5. The system of claim 4, wherein:
    said switching circuit is configured among said first configuration and said second configuration based on a type of headend to which said first transceiver is coupled.

6. The system of claim 1, wherein:
    said switching circuit is configured among said first configuration and said second configuration based on a type of headend to which said first transceiver is coupled.

7. The system of claim 1, wherein said switching circuit is configured based on a control signal received via said optical link.

8. The system of claim 1, wherein said circuitry is operable to:
    autonomously detect a type of headend connected to said optical link; and
    configure said switching circuit based on said detected type of headend.

9. The system of claim 1, wherein said second processing path is operable to perform functions of a cable modem terminal system (CMTS).

10. The system of claim 9, wherein said functions of said CMTS include media access planning for allocating bandwidth on said electrical link.

11. A method comprising:
    performing by circuitry of a hybrid fiber-coaxial network:
        selecting between a first configuration of a switching circuit of said circuitry and a second configuration of said switching circuit based on a type of headend to which said circuitry is connected via an optical link, wherein:
            in said first configuration, said switching circuit couples a first transceiver of said circuitry to a second transceiver of said circuitry via a first processing path;
            in said second configuration, said switching circuit couples said first transceiver of said circuitry to said second transceiver of said circuitry via a second processing path;
            in said first configuration, said first transceiver is coupled to said circuitry to said optical link using one or both of an upstream external PHY interface (UEPI) and a downstream external PHY interface (DEPI);
            in said second configuration, said first transceiver is coupled to a headend that does not use either a UEPI or a DEPI; and
            said second transceiver is configured to connect said circuitry to an electrical link.

12. The method of claim 11, wherein:
    said first transceiver comprises a passive optical network (PON) transceiver; and
    said second transceiver comprises a data over coaxial service interface specification (DOCSIS) physical layer transceiver.

13. The method of claim 12, wherein:
    said first processing path comprises one or both of a UEPI and a DEPI; and
    said second processing path comprises an optical network unit (ONU) and a DOCSIS media access control (MAC) circuit.

14. The method of claim 13, comprising:
    configuring, by said circuitry, said switching circuit among said first configuration and said second configuration based on a type of headend to which said first transceiver is coupled.

15. The method of claim 12, wherein:
said first processing path comprises a packet shelf to access shelf interface (PASI); and
said second processing path comprises a protocol bridging circuit and a DOCSIS media access control (MAC) circuit.

16. The method of claim 15, comprising:
configuring, by said circuitry, said switching circuit among said first configuration and said second configuration based on a type of headend to which said first transceiver is coupled.

17. The method of claim 11, comprising configuring, by said circuitry, said switching circuit based on a control signal received via said optical link.

18. The method of claim 11, comprising:
detecting, by said circuitry, a type of headend connected to said optical link; and
configuring, by said circuitry, said switching circuit based on said detected type of headend.

19. The method of claim 11, wherein said second processing path is operable to perform functions of a cable modem terminal system (CMTS).

20. The method of claim 19, wherein said functions of said CMTS include media access planning for allocating bandwidth on said electrical link.

\* \* \* \* \*